US008679671B2

(12) United States Patent
Witting

(10) Patent No.: US 8,679,671 B2
(45) Date of Patent: Mar. 25, 2014

(54) INTEGRATED SENSE LEAD MODULE FRAME

(75) Inventor: Daniel F. Witting, Eastpointe, MI (US)

(73) Assignee: GM Global Technology Operations LLC, Detroit, MI (US)

(*) Notice: Subject to any disclaimer, the term of this patent is extended or adjusted under 35 U.S.C. 154(b) by 403 days.

(21) Appl. No.: 13/096,410

(22) Filed: Apr. 28, 2011

(65) Prior Publication Data

US 2012/0276430 A1 Nov. 1, 2012

(51) Int. Cl.
*H01M 6/42* (2006.01)
*H01M 2/20* (2006.01)

(52) U.S. Cl.
CPC .............. *H01M 2/202* (2013.01); *H01M 2/204* (2013.01); *H01M 2/206* (2013.01)
USPC .......................................... 429/158; 429/160

(58) Field of Classification Search
USPC ........... 429/160, 180, 186, 151, 152; 439/291
See application file for complete search history.

(56) References Cited

U.S. PATENT DOCUMENTS

| 5,378,552 A * | 1/1995 | Dixon, Jr. ........................ 429/91 |
| 2007/0048595 A1 * | 3/2007 | Graham et al. ................. 429/62 |
| 2007/0124980 A1 * | 6/2007 | Yang ............................ 42/75.03 |
| 2010/0216007 A1 * | 8/2010 | Kane et al. ..................... 429/153 |

* cited by examiner

*Primary Examiner* — Zachary Best
(74) *Attorney, Agent, or Firm* — Fraser Clemens Martin & Miller LLC; J. Douglas Miller

(57) ABSTRACT

A frame for a battery cell includes a main body with an aperture configured to receive the battery cell. A header is disposed at an end of the main body. The header including a plurality of electrically conductive pins disposed through the header. The electrically conductive pins are configured to cooperate with pins in an adjacent frame.

13 Claims, 6 Drawing Sheets

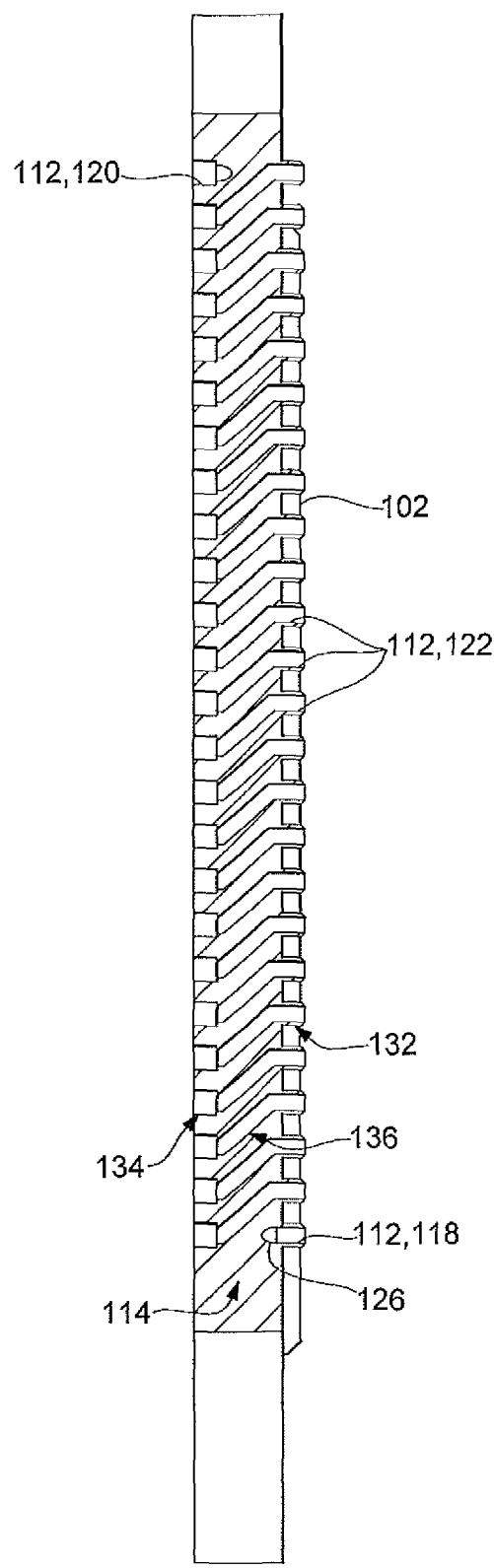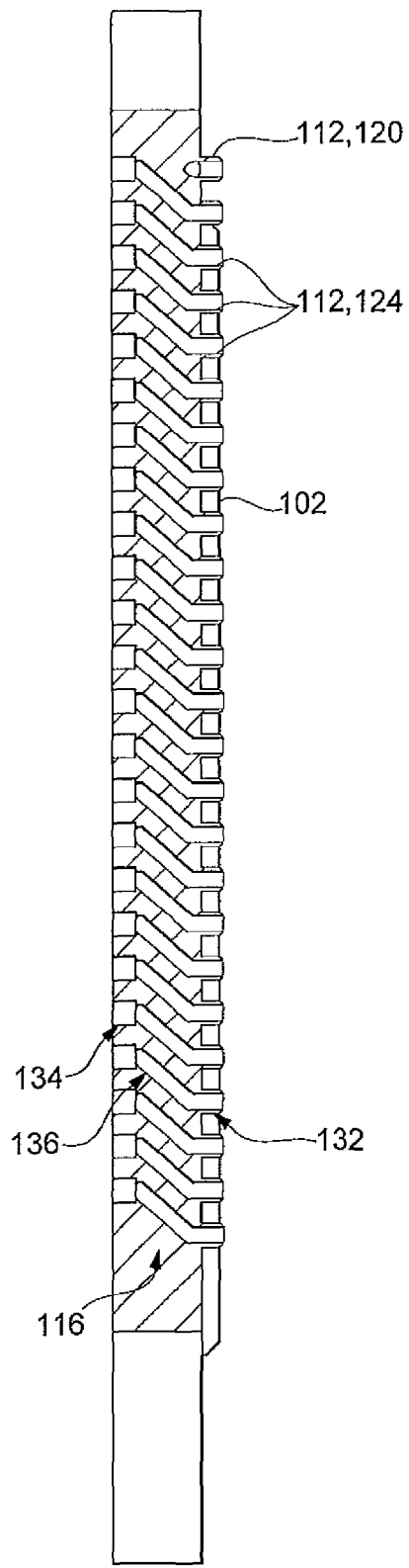
FIG.5  FIG.6

INTEGRATED SENSE LEAD MODULE FRAME

FIELD OF THE INVENTION

The present disclosure relates to a battery pack and more particularly to a frame for an individual battery cell of the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells.

Typical prismatic battery cells have a pair of plastic coated metal layers fused around a periphery of the battery cell in order to seal the battery cell components. The sealing of the battery cell components generally begins with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell is thereby provided.

A plurality of individual battery cells can be provided in a battery pack to provide an amount of power sufficient to operate electric vehicles. Where the plurality of individual battery cells is employed, each of the battery cells may be disposed in a frame that cooperates with adjacent frames to align the battery cells in the battery pack. A typical frame is described in Assignee's co-pending U.S. patent application Ser. No. 12/651,640 to Weber et al., the entire disclosure of which is hereby incorporated herein by reference. The frame may include manifold apertures that define supply and exhaust manifolds for bulk transport of cooling fluid to and from cooling plates disposed between the individual battery cells. The frame may also include holes that cooperate with compression or tie rods to align and hold the battery cells in a stack to form the battery pack.

Typically, a plurality of external voltage sensing wires and wire harnesses is required to monitor a voltage of each battery cell within the battery pack. This arrangement is undesirable, as the voltage sensing wires carry high voltages and the number of voltage sensing wires and associated plugs increase a complexity of the battery pack. The external voltage sensing wires also undesirably impact a sealing of the battery pack, as the wires often extend between sealed interfaces between adjacent modules of the battery pack. Different designs for different frame assemblies within the battery pack are also often used in order to accommodate the large number voltage sensing wires and associated plugs.

There is a continuing need for a frame for a battery cell frame that permits voltage sensing without using external sense lead wires and wire harnesses in the battery pack. Desirably, the frame has sense lead wires integrated therein, minimizes a potential for exposure to high voltage wires and accidental plugging of external wires into incorrect wire harnesses, and provides a common design for all frames in order to minimize a number of parts needed in assembly of the battery pack and allow for a larger volume production of a single frame.

SUMMARY OF THE INVENTION

In concordance with the instant disclosure, a frame for a battery cell that permits voltage sensing without using external sense lead wires and wire harnesses in the battery pack, which has the sense lead connections integrated therein, minimizes a potential for exposure to high voltage wires and accidentally plugging external wires into incorrect wire harnesses, and provides a common design for all frames to minimize a number of parts needed in assembly of the battery pack and allow for a larger volume production of a single frame, is surprisingly discovered.

The present disclosure utilizes headers with a plurality of cascading pins to transfer sense lead voltages through each frame. A primary or initial pin is connected to a battery cell tab. A signal is sent along each of the remaining sense lead pins through the cascading configuration. The cascading pins desirably permit the use of a common repeatable frame for all of the battery cells of a battery pack.

In a first embodiment, a frame for a battery cell includes a main body with an aperture configured to receive the battery cell. A header is disposed at an end of the main body. The header including a plurality of electrically conductive pins disposed through the header. The electrically conductive pins are configured to cooperate with pins in an adjacent frame.

In another embodiment, a battery cell assembly includes a battery cell and a frame. The frame includes a main body with an aperture receiving the battery cell. A header is disposed at an end of the main body. The header includes a plurality of electrically conductive pins configured cooperate with pins in an adjacent frame.

In a further embodiment, a battery pack includes a plurality of battery cell assemblies. Each battery cell assembly has a battery cell and a frame including a main body with an aperture receiving the battery cell. A header is disposed at an end of the main body. The header includes a plurality of electrically conductive pins. The electrically conductive pins of one of the battery cell assemblies cooperate with the electrically conductive pins of an adjacent one of the battery cell assemblies.

DRAWINGS

The above, as well as other advantages of the present disclosure, will become readily apparent to those skilled in the art from the following detailed description, particularly when considered in the light of the drawings described herein.

FIG. 5 is a side cross-sectional elevational view of the frame for the battery cell identified by section line 5 in FIG. 2;

FIG. 6 is a side cross-sectional elevational view of the frame for the battery cell identified by section line 6 in FIG. 2;

Figure 7:
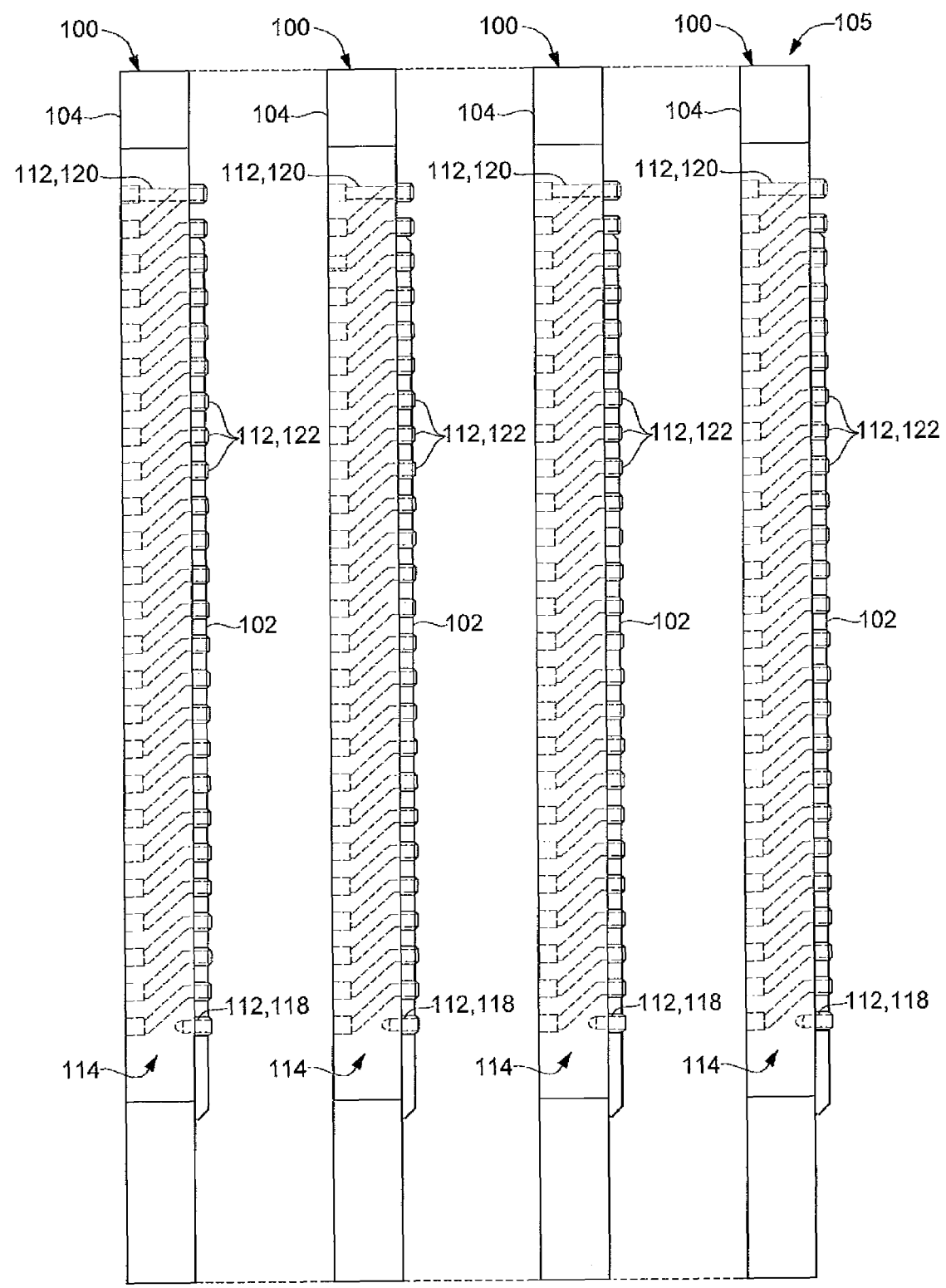
Figure 8:
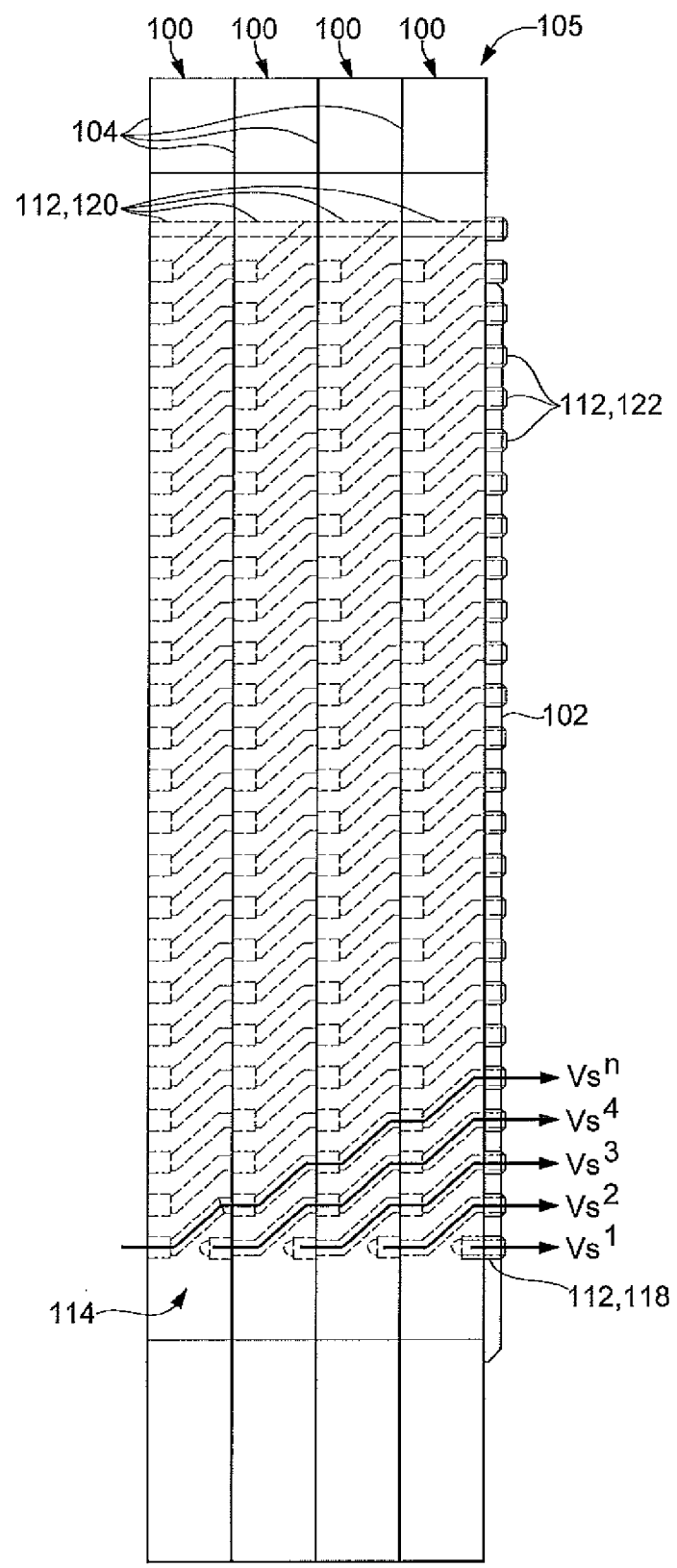

FIG. 7 is an exploded side elevational view of a plurality of the frames illustrated in FIGS. 1-6, with electrically conductive pins of a first column shown in dashed lines; and FIG. 8 is a side elevational view of the plurality of the frames for the battery cells illustrated in FIG. 7, shown assembled with an electrical pathway defined by the cooperation of the electrically conductive pins disposed through the plurality of the frames identified by arrowed lines.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
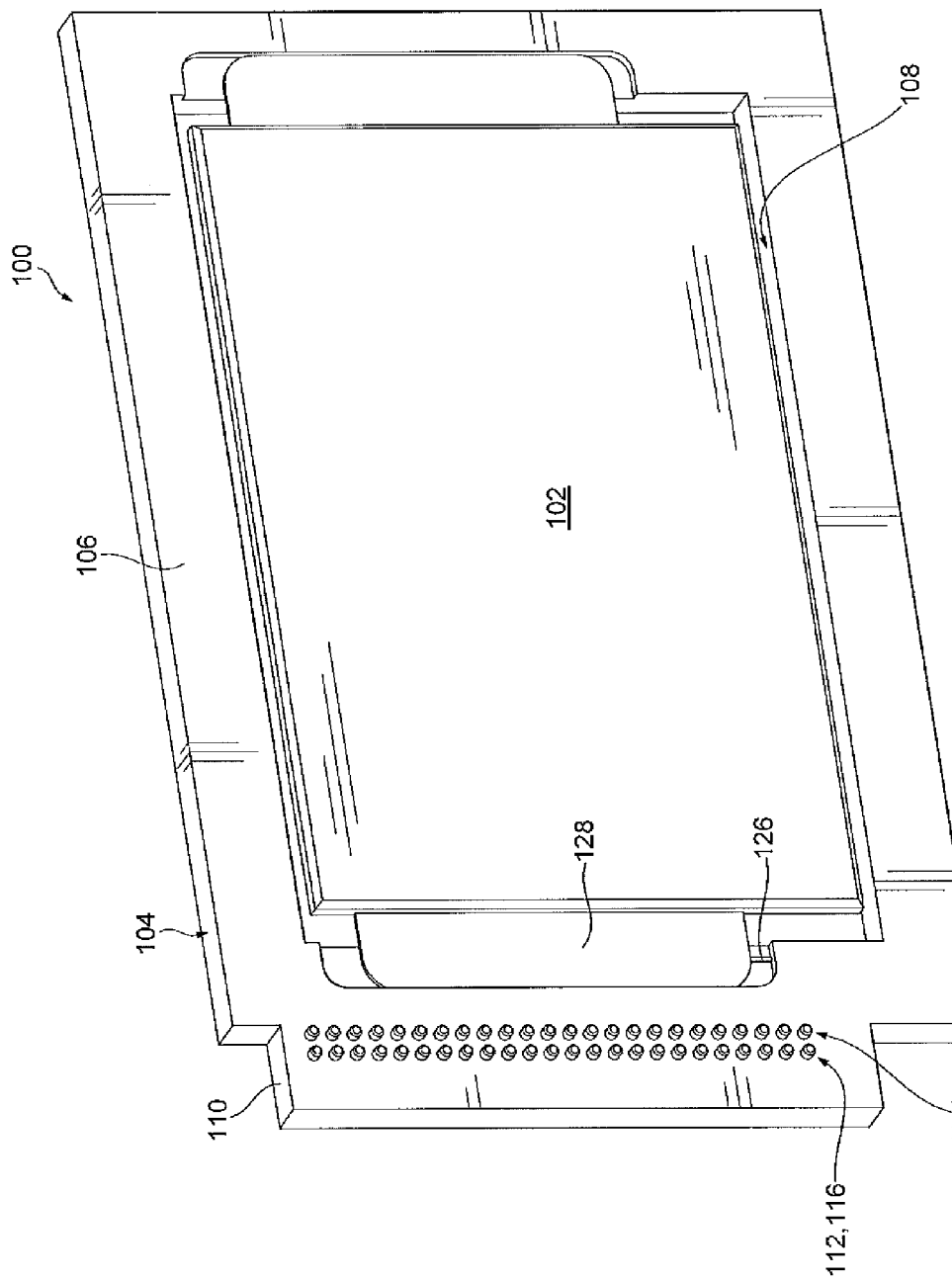
FIG. 1 is a front perspective view of a frame for a battery cell according to the present disclosure.
Figure 2:
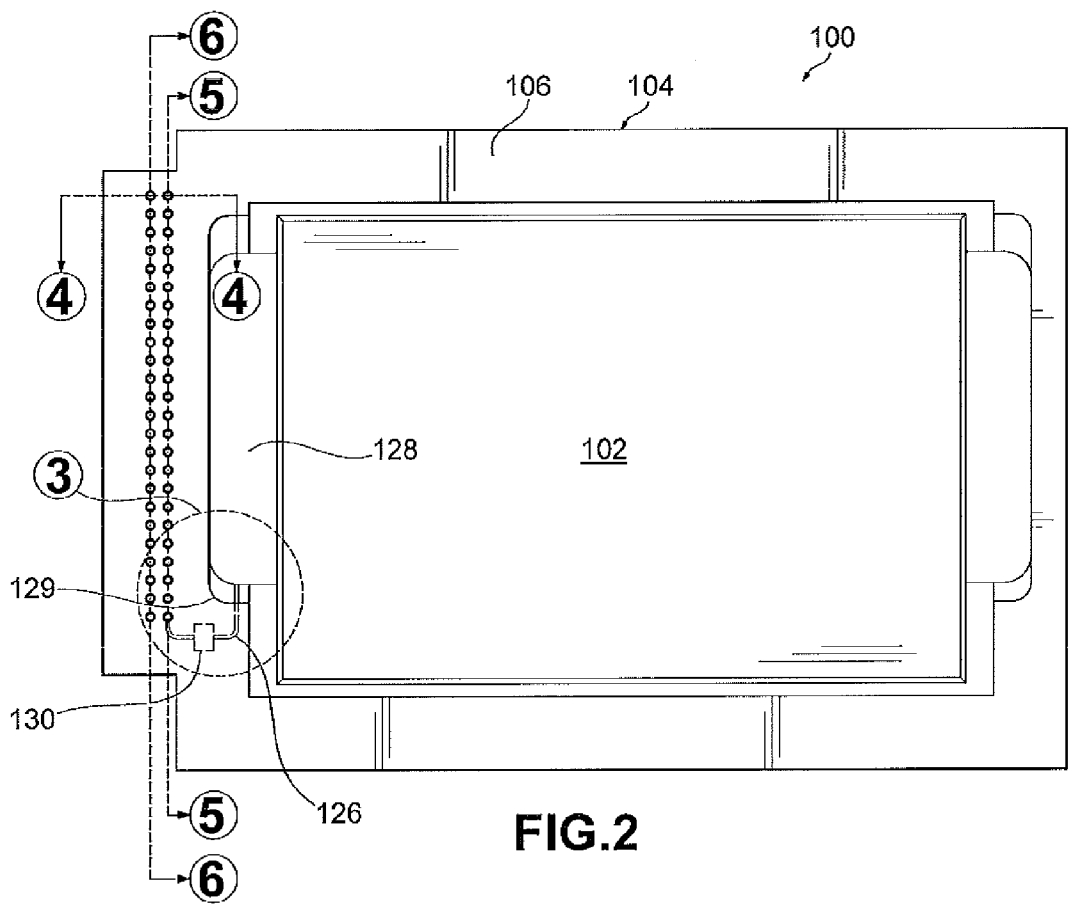
FIG. 2 is a front elevational view of the frame for the battery cell shown in FIG. 1.
Figure 3:
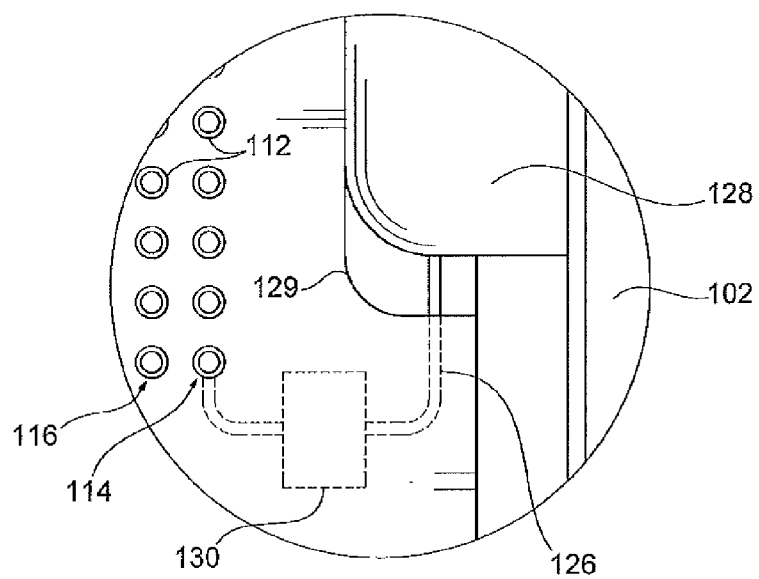
FIG. 3 is an enlarged fragmentary front elevational view of the frame for the battery cell identified by callout 3 in FIG. 2.

With reference to FIGS. 1-3, a battery cell assembly 100 according to the present disclosure is shown. The battery cell assembly 100 includes a battery cell 102 and a frame 104. The battery cell 102 shown is a prismatic battery cell. As a nonlimiting example, the battery cell 102 may be a prismatic lithium ion (Li-ion) battery cell. It should be appreciated that other battery cells 102, employing a different structure and electrochemistry, may also be used within the scope of the present invention. A plurality of the battery cell assemblies 100 may be disposed in a stack to form a battery pack 105 (shown in FIGS. 7-8).

The frame 104 for the battery cell 102 includes a main body 106 with an aperture 108 formed therein. The main body 106 is formed from an electrically nonconductive material, for example, a thermoplastic or a rubber. Other electrically nonconductive materials may also be used, as desired. The aperture 108 of the main body 106 is configured to receive the battery cell 102. A header 110 is disposed at an end of the main body 106. Although only one header 110 is shown, it should be appreciated that other headers disposed at other ends or sides of the main body 106 may also be employed within the scope of the present disclosure.

The header 110 includes a plurality of electrically conductive pins 112. The electrically conductive pins are formed from an electrically conductive material such as copper or steel, as nonlimiting examples. Other electrically conductive materials may also be used, as desired. The pins 112 are disposed through the header 110 and are configured to cooperate with related pins 112 in an adjacent frame 104, for example, as shown in FIGS. 7-8.

With renewed reference to FIGS. 1-3, the plurality of pins of the frame 104 may include a first column 114 of the pins 112 and a second column 116 of the pins 112. The first column 114 may include an initial pin 118, a terminal pin 120, and a plurality of first cascading pins 122, as shown in FIGS. 5-8. The first cascading pins 122 are disposed between the initial pin 118 and the terminal pin 120. The second column 116 shares the terminal pin 120 from the first column 114 and also includes a plurality of second cascading pins 124.

The initial pin 118 is connected to an electrical conductor 126. The electrical conductor 126 is disposed through the header 110 and places the initial pin 118 in electrical communication with the battery cell 102. For example, the electrical conductor 126 may include an electrically conductive wire or strip that one of abuts and is welded to a cell tab 128 of the battery cell 102. The main body 106 of the frame 104 may include a recess 129, for example, that receives the cell tab 128. The electrical conductor 126 may be disposed in the recess 129 to contact the cell tab 128 when the battery cell 102 is disposed in the frame 104. The electrical conductor 126 may further include a fuse 130 used to militate against undesirable electrical activity of the battery cell 102. The fuse 130 may be disposed inside the heater 110 or disposed external to the header 110, for example, for ease in replacement, as desired.

Figure 4:
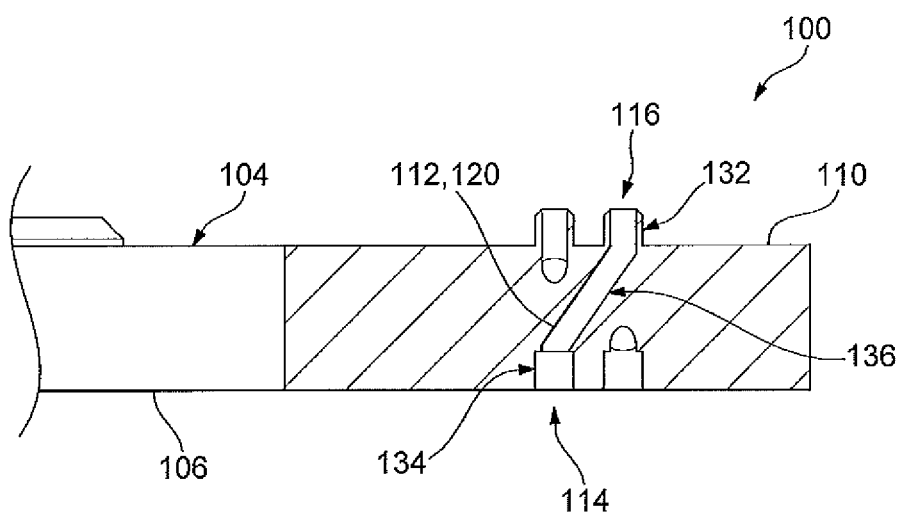
FIG. 4 is a fragmentary cross-sectional top plan view of the frame for the battery cell identified by section line 4 in FIG. 2.

As illustrated in FIG. 4, and similar to the pins 112 having the cascading configuration shown in FIGS. 5 and 6, the terminal pin 120 may include a male portion 132, a female portion 134, and a connecting portion 136. In contrast to the cascading configuration, however, the terminal pin 120 steps laterally outward from the first column 114 to the second column 116 to begin the second column 116. The addition of the second column 116 to the first column 116 permits the stacking of many more battery cells 102 in the battery pack 105 than would be permitted with only the first column 114, by permitting a signal path from the battery cells 102 to be transferred laterally outward from the first column 116 when a number of battery cells 102 exceeds a number of pins 112.

As shown in FIGS. 5 and 6, at least a portion of the pins 112 in the first and second columns 114, 116 have the cascading configuration. For example, the first and second cascading pins 122, 124 of the first and second columns 114, 116 each include the male portion 132, the female portion 134, and the connecting portion 136. The connecting portion 136 is disposed between the male portion 132 and the female portion 134 and electrically connects the male portion 132 to the female portion 134. As a nonlimiting example, the male portion 132 may be spaced apart from, and oriented in parallel with, the female portion 134. The connecting portion 136 may be oriented transverse to each of the male portion 132 and the female portion 134 to form the cascading configuration of each of the first and second cascading pins 122, 124. It should be appreciated that the cascading configuration of the first and second cascading pins 122, 124 in the first and second columns 114, 116 advantageously permits a same design for the frame 112 to be used for each of the battery cells 102 in the battery pack 105. The signal path for each of the battery cells 102 always begins at the initial pin 118 and cascades through the adjacent frames 104. Different designs for the frames 104, depending upon location within the stack, are therefore unnecessary.

One of ordinary skill in the art should understand that further columns of the pins 112 may also be added, for example, based upon a desired number of the battery cells 102 in the battery pack 105. The further columns include further cascading pins 122, 124 and further shared terminal pins 120, for example, as shown with the first and second columns 114, 116 illustrated in FIGS. 4-6 of the disclosure.

Referring now to FIGS. 7 and 8, the battery pack 105 of the present disclosure includes a plurality of the battery cell assemblies 100 described hereinabove. The electrically conductive pins 112 of one of the battery cell assemblies 100 cooperate with the electrically conductive pins 112 of an adjacent one of the battery cell assemblies 100. The integration of the first and second cascading pins 122, 124 into the header 110 of the frame 104 provides a repeatable sense lead connection frame-to-frame that is passed along by the first and second cascading pins 122, 124 in each of the frames 104.

It should be understood that the initial pin 118 of each one of the frames 104 is connected to an adjacent one of the first cascading pins 122 of the adjacent one of the frames 104. Likewise, the first cascading pins 122 of each one of the frames 104 is connected to an adjacent one of the first cascading pins 122 of the adjacent one of the frames 104. The first cascading pins 122 thereby transfer electrical signals such as sensed voltage (e.g., $Vs^1, Vs^2, Vs^3, Vs^4, Vs^n$) up the connected cascading pins 122 and allow any number of the frames 104 to be used. This is advantageous because, regardless of the number of battery cells 102 and associated frames 104, the same repeatable design for the frame 104 is employed. Although the frame 104 of the present disclosure is described with respect to sensed voltages, it should be appreciated that the invention may also be used to measure other signals from the battery cells 102 and equipment incorporated in the battery pack 105, as desired.

Since the cascading pins 122 follow a same pattern, interference to the cascading pins 122 will always reflect each battery cell 102 in a predicable way. A scaling of the battery pack 105 to employ more or fewer battery cells 102 is also readily permitted by the repeatable frames 104 of the present disclosure. The frame 104 of the present disclosure further advantageously permits an elimination of individually connected wire harnesses to each individual frame, as is performed with known battery packs. A monitoring module (not shown) for detecting electrical signals such as sensed voltage may be disposed at a last one of the frames 104 in a sequence of the frames 104 using a mating connector (not shown) to mate to the last one of the frames 104.

Advantageously, the frame 104 of the present disclosure minimizes an exposure to wires carrying high voltages, as well as a complexity of the battery pack 105 due to an elimination of external sense leads and wire harnesses. The pins 112 of the present disclosure are also more robust than known sense lead wires, due to the disposition of the pins 112 within the main body 106 of the frame 104, and permit a superior sealing of the battery pack 105. Furthermore, the employment of a common, repeatable frame 104 design for all the battery cells 102 of the battery pack 105 minimizes a number of parts required in assembly of the battery pack 105 while permitted a larger volume production of the single frame 104.

While certain representative embodiments and details have been shown for purposes of illustrating the invention, it will be apparent to those skilled in the art that various changes may be made without departing from the scope of the disclosure, which is further described in the following appended claims.

What is claimed is:

1. A frame for a battery cell, comprising:
a main body with an aperture configured to receive the battery cell; and
a header disposed at an end of the main body, the header including a plurality of electrically conductive pins disposed therein and configured to cooperate with pins of an adjacent frame, wherein at least one of the pins is a cascading pin including a male portion, a female portion, and a connecting portion disposed between the male portion and the female portion, the male portion oriented in parallel with the female portion, and the connecting portion oriented transverse to each of the male portion and the female portion to the connection to the female portion.

2. A frame for a battery cell, comprising:
a main body with an aperture configured to receive the battery cell; and
a header disposed at an end of the main body, the header including a plurality of electrically conductive pins disposed therein and configured to cooperate with pins of an adjacent frame, the plurality of pins including a first column of pins and a second column of pins, the first column of pins including an initial pin, a terminal pin, and a plurality of cascading pins disposed between the initial pin and the terminal pin, wherein the terminal pin steps from the first column of pins to the second column of pins to begin the second column of pins.

3. The frame of claim 2, wherein the initial pin is connected to an electrical conductor providing electrical communication between the initial pin and the battery cell.

4. The frame of claim 3, wherein the electrical conductor includes a fuse.

5. The frame of claim 2, wherein the second column of pins shares the terminal pin from the first column of pins and further includes a plurality of cascading pins.

6. The frame of claim 5, wherein an orientation of the cascading pins of the first column of pins is opposite an orientation of the cascading pins of the second column of pins.

7. A battery cell assembly, comprising:
a battery cell; and
a frame including a main body with an aperture receiving the battery cell, and a header disposed at an end of the main body, the header including a plurality of electrically conductive pins configured to cooperate with pins of an adjacent frame, the plurality of pins including a first column of pins and a second column of pins, the first column of pins including an initial pin, a terminal pin, and a plurality of cascading pins disposed between the initial pin and the terminal pin, wherein the terminal pin steps from the first column of pins to the second column of pins to begin the second column of pins.

8. The battery cell assembly of claim 7, wherein the battery cell includes a cell tab, the cell tab in electrical communication with an initial pin in the header of the frame via an electrical conductor disposed through the header.

9. The battery cell assembly of claim 8, wherein the electrical conductor is welded to the cell tab.

10. The battery cell assembly of claim 9, wherein the electrical conductor includes a fuse disposed between the cell tab and the initial pin.

11. The battery cell assembly of claim 8, wherein the main body of the frame further comprises a recess formed therein receiving the cell tab.

12. The battery cell assembly of claim 7, wherein the second column of pins shares the terminal pin from the first column of pins and further includes a plurality of cascading pins.

13. A battery pack, including
a plurality of battery cell assemblies according to claim 7, wherein the electrically conductive pins of one of the battery cell assemblies cooperate with the electrically conductive pins of an adjacent one of the battery cell assemblies.

* * * * *